Aug. 2, 1927.

V. N. DELGADO 1,637,477

INSECT EXTERMINATING MACHINE

Filed Sept. 1, 1925

V. Neville Delgado
INVENTOR.

BY G. C. Waldrop

ATTORNEY.

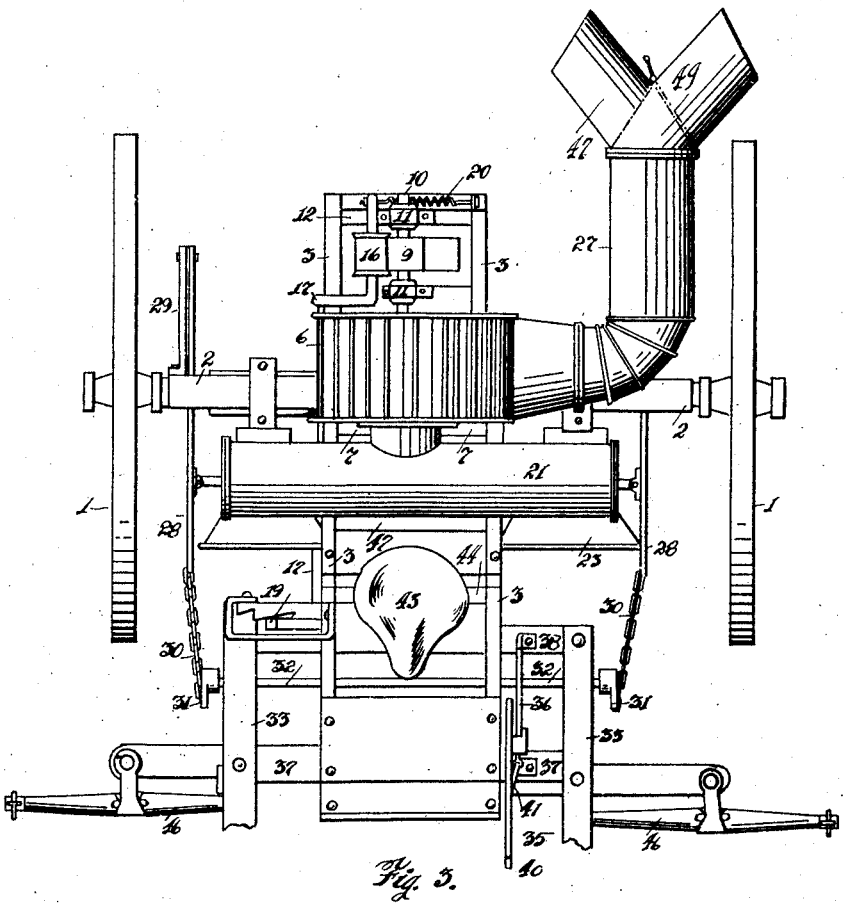

Aug. 2, 1927. 1,637,477
V. N. DELGADO
INSECT EXTERMINATING MACHINE
Filed Sept. 1, 1925  3 Sheets-Sheet 3

V. Neville Delgado
INVENTOR.

BY
ATTORNEY.

Patented Aug. 2, 1927.

1,637,477

UNITED STATES PATENT OFFICE.

VERNON NEVILLE DELGADO, OF WACO, TEXAS.

INSECT-EXTERMINATING MACHINE.

Application filed September 1, 1925. Serial No. 53,810.

This invention relates to new and useful improvements in machines designed for the purpose of exterminating boll weevils and other destructive insects, and it refers particularly to a machine of the class designated, especially equipped with facilities for carrying more than a single row, as in the case of its applicability to weevil infested cotton.

The invention primarily comprehends the provision of a fan, arranged through suction, to remove insects and other infected particles from the plants as the machine is drawn over the rows.

Another object of the invention aims to afford a means to convey said insects, including punctured or infected squares of cotton plants, or other masses of matter containing larvæ or eggs of the insects through an especially arranged fanning device, which will totally destroy the insect and its larvæ and eggs which may ultimately propagate and prove injurious to the vegetation.

Further, the invention aims to provide through said fanning device, to effect discharge of the masses of matter drawn into said fan after thorough disintegration thereof.

With the foregoing and other objects and advantages in view, the invention has particular reference to certain novel features of construction and assembly of parts, as well as other novel advantages, which will be more clearly understood by reference to the following detail description, taken in connection with the appended drawings, wherein:

Figure 3 is a top plan view.

Figure 5 is a vertical sectional view of the fan in side elevation, illustrating the passage of the masses of matter therethrough to effect substantial disintegration thereof.

Figure 2:
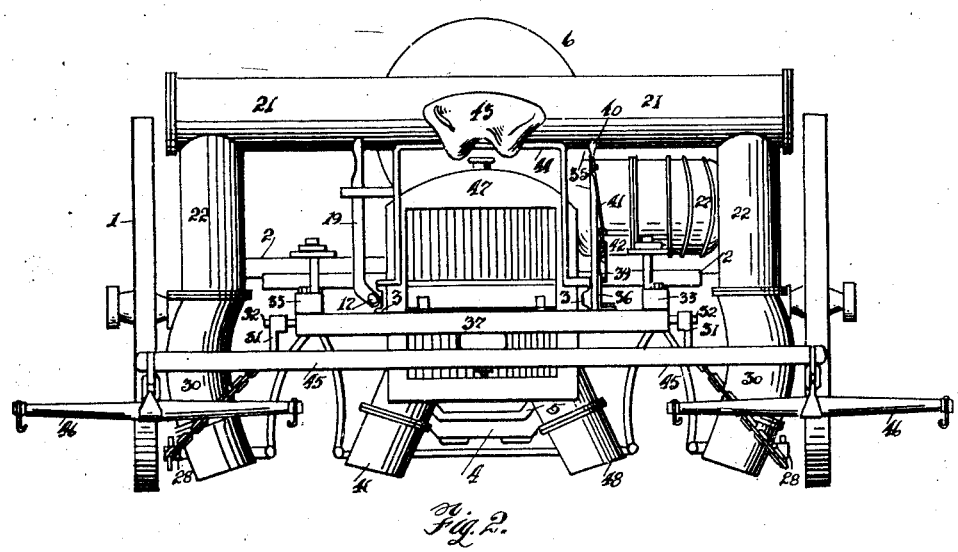
Figure 2 is a similar view showing the double suction attachment.

In proceeding further in detail, attention is directed to the drawings, wherein the machine is shown provided with wheels 1, rotatably mounted upon the axles 2, which latter are adjustably affixed to the frame 3, upon which an engine 4 is mounted and securely held in place by straps 5 in such a manner as to swing the greater portion of the weight of the engine below the center level of the axles 2.

The fan 6 is situated directly above the engine 4 upon the frame 3 and secured in position by means of straps 7, while the fly wheel or propelling pulley 8 is disposed beneath the fan, slightly rearwardly thereof. Upon the fan shaft 10 is situated a fan pulley 9, the former being mounted in ball bearings 11, which are secured upon one of the straps 7 and an outer strap or brace 12, which latter has its lower ends affixed to the rear ends of the frame 3.

A belt 13 surrounds the pulleys 8 and 9, which engages the fan 6 with the motor 4, the latter being set into motion by rotating the crank 14, which is retained in place by bracket 15 depending from the frame 3.

In order to prevent slippage of the belt 13 upon the pulleys 8 and 9, an idler pulley 16 is provided, as in Figure 3 of the drawings, which is situated upon a spindle 17, the latter being bent into suitable shape so as to extend downwardly and along the frame 3, to which it is fastened by straps (not shown) and its opposite end bent upwardly, acting as a lever arm 19, whereby to actuate said idler pulley 16 out of contact with the belt 13, as the said pulley is held against the belt by a tension spring 20, a view of which is illustrated only in Figure 3.

Figure 1:
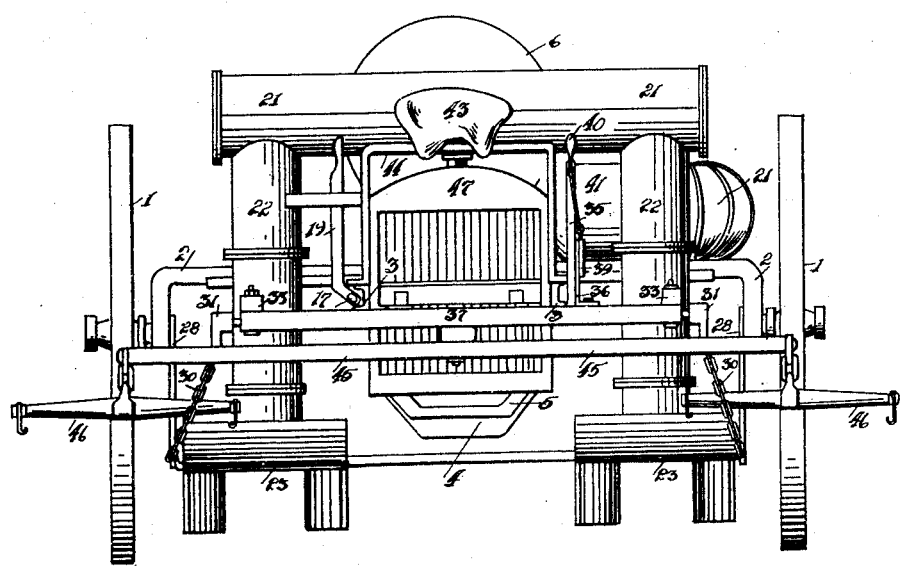
Figure 1 represents a front elevational view of the invention, illustrating a single direct suction arrangement.
Figures 4, 6:
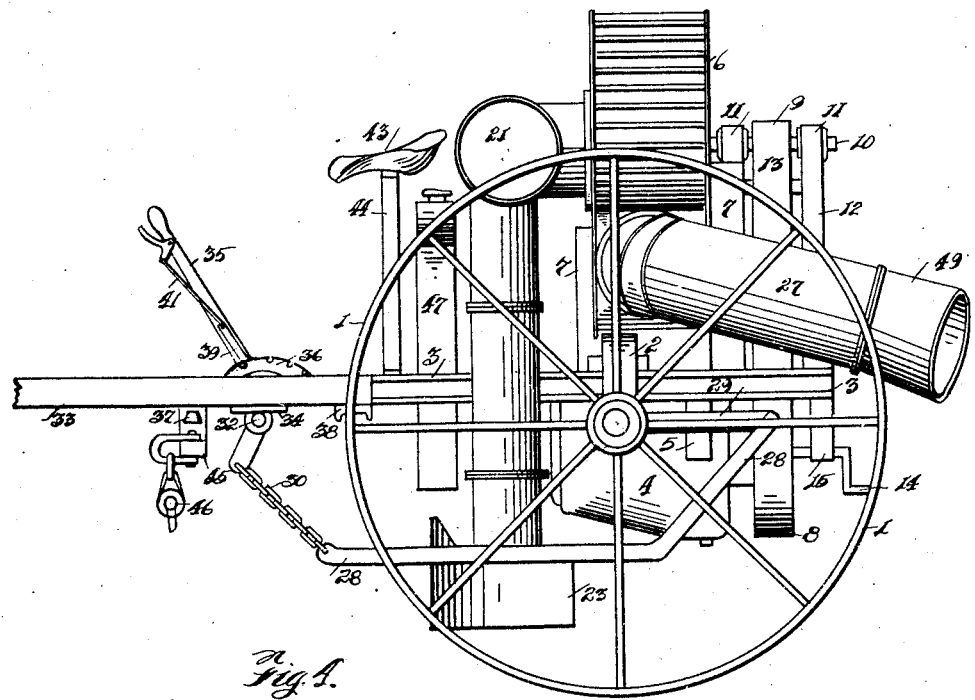
Figure 4 is a left side elevation.
Figure 6 represents a vertical elevational view of the fan in axial cross-section, likewise denoting the passage of matter therethrough.

A lateral suction pipe 21 is provided, which is preferably T shaped in form thereby to branch out to each row and upon either end is secured flexible conduits 22 and adapted to depend therefrom. Upon the ends of the conduits 22, cones 23 are affixed as illustrated in Figure 1, which latter conforms with the rows of vegetation on either side thereof. This arrangement permits plants to pass directly beneath the suction line, and by which all infected or fallen squares, as well as other particles infested with weevils and other insects are gathered and carried through the suction line 22 and into contact with the fan blades 24, (see Figures 5 and 6) which latter are mounted upon a spider 25. The back side of the fan blades 24 are secured to a cone shaped disc 26, and the blades are flared at their ends so as to produce an uneven pressure at the outer points thereof, thus forcing the squares and other infested particles to dip back into the blades, as indicated by the arrows in each of the Figures 5 and 6, thus thoroughly pulverizing the young bolls and squares, to destroy all eggs and larvæ of the insects, as well as the insects themselves.

It should be further observed that the fan is of such construction that the eddy currents of air indicated by the broken lines and arrows, carry the masses of matter drawn thereby about the blades a number of times at a high rate of speed in order to thoroughly beat them to pieces and expel the same through the discharge line 27, which latter is bifurcated as shown in Figure 3, the purpose of which will be later made clear.

The cones 23, it will be observed, are controlled through the actuation of a lever arm 28, which latter has its rear end pivoted to a bracket 29, (see Figure 3) and which is secured to the axle 2. A chain 30 is secured to the front end of the lever 28, while the opposite end thereof is secured to a lifting lever 31, which is affixed to a rod 32 mounted upon the under side of the tongues 33 by braces 34, as in Figure 4. A hand lever 35 is affixed to the said rod 32 and a notched bracket 36 is secured upon a cross-brace 37 and 38 and is fitted with the said hand lever 35, whereby when the dog 39 is lifted by depressing the hand grip 40, by way of pulling the connecting link 41, the lever is pulled back or adjusted to the place desired and held by spring 42. This arrangement regulates the position of the cones 23 to a position above the plants.

A seat 43 is further provided which is secured on the top side of the U shaped strap 44, which in turn is affixed to the frame 3.

Attention is again directed to the tongues 33, two of which are provided, which are supported by as many cross-bars 37 and 38. The two said bars are affixed to the front of the frame 3 and under the bar 37 a double tree 45 is pivoted centrally thereof and to each end of the same, single trees 46 are fastened in the usual manner, whereby to permit the horses, or other propelling agent to travel between the rows.

The usual engine radiator 47 is shown, which is secured to the frame 3, preferably under the seat 43, as shown.

It will be observed in Figure 2 that a double suction 48 is provided, which affords an independent suction for either side of the row and permits the plants to pass between same. The suction picks up all fallen squares from the middle, as well as from under the stalks and may be employed for use on cotton that has reached the matured stage. The suction arrangement employed upon the machine illustrated in Figure 1, whereon the cones 23 are used is more especially adapted for cotton in the early stage of growth, however, it should be understood that these different arrangements may be interchangeable, depending upon the size of the plants upon which it is desired to be used.

It has been found desirable when working a row of plants, to agitate an adjoining row prior to working, in order to shake off all loose and infected squares, as well as weevils, which are known to sull and drop off when molested. A novel arrangement has been devised, which consists of the bifurcated end on the discharge pipe 27, as previously mentioned. Air pressure induced by the fan 6 being passed through this pipe as well as particles of pulverized matter, permits the same to be readily used, when directed toward an adjoining row of unworked plants, to shape the stalks for the purposes mentioned, and a small trap door 49 is employed to direct the current of air through either of the ends of the pipe 27 desired. See Figure 3.

It should be understood herein that it is not desired that the invention be limited to the specific disclosure herein set forth, and that certain minor changes and modifications may be resorted to as fall within the meaning and scope of what is herein claimed.

I claim:

1. In an insect exterminating machine, the combination with a wheeled supporting frame of a bladed fan mounted on said frame of a coniform baffle plate adjacent the blades of said fan; of a pipe in communication with said fan laterally disposed across said frame having a plurality of flexible suction conduits depending therefrom; of means for driving said fan operative to extract insects and other infested particles from vegetation and convey same into the blades of said fan as said machine is drawn thereover, and means for discharging the masses of matter against an adjacent row of said vegetation.

2. An insect exterminating machine including a wheeled frame supporting an encased fan having a conical disc thereon and rotatable therewith; a driving means for said fan arranged to be swung below the axles of said frame; a lateral suction pipe connected with said fan having flexible conduits depending from its either end whereby to extract said insects from vegetation by suction created by said fan; a discharge spout connected to the fan housing through which to discharge said insects.

3. An insect exterminating machine comprising a wheeled frame having an encased fan mounted thereon arranged to create a suction; means for driving said fan a coniform baffle plate integral with said fan; a lateral suction pipe connected to said fan housing having means thereon to engage rows of vegetation, the suction created by said fan to extract insects and infested matter from said vegetation and convey the same to said fan whereby to cause disintegration of said insects and masses of matter by contact with the said fan and baffle plate, and means to discharge the disintegrated masses from said fan.

4. An insect exterminating apparatus including an encased fan a cone shaped baffle integral with said fan; a suction pipe connected to said fan casing; a bifurcated discharge pipe also connected to said fan casing a pivoted door disposed rearwardly of the bifurcated portion of said discharge pipe to change the direction of its discharge and means for driving said fan to create a suction whereby to draw insects and infested particles into said fan to be disintegrated by the blades and baffle thereof, and be expelled through said bifurcated discharge pipe.

In testimony whereof I affix my signature.

V. NEVILLE DELGADO.